(12) United States Patent
Lee

(10) Patent No.: US 12,175,207 B2
(45) Date of Patent: Dec. 24, 2024

(54) MULTI-INPUT MULTI-OUTPUT FIRST-IN FIRST-OUT BUFFER CIRCUIT THAT READS OUT MULTIPLE DATA FLITS AT ONCE, AND ELECTRONIC CIRCUITS HAVING SAME

(71) Applicant: Samsung Electronics Co., Ltd., Suwon-si (KR)

(72) Inventor: Yewon Lee, Ansan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 197 days.

(21) Appl. No.: 18/060,806

(22) Filed: Dec. 1, 2022

(65) Prior Publication Data

US 2023/0244443 A1 Aug. 3, 2023

(30) Foreign Application Priority Data

Feb. 3, 2022 (KR) .................. 10-2022-0014453

(51) Int. Cl.
*G06F 5/16* (2006.01)
(52) U.S. Cl.
CPC ..................... *G06F 5/16* (2013.01)
(58) Field of Classification Search
CPC ........................................................ G06F 5/16
USPC .................................................... 365/189.05
See application file for complete search history.

(56) References Cited

U.S. PATENT DOCUMENTS

| | | | |
|---|---|---|---|
| 5,136,582 A | 8/1992 | Firoozmand | |
| 5,224,093 A | 6/1993 | Denzel et al. | |
| 5,958,026 A | 9/1999 | Goetting et al. | |
| 5,974,516 A | 10/1999 | Qureshi | |
| 6,526,495 B1 * | 2/2003 | Sevalia | G06F 5/065 711/173 |
| 6,538,467 B2 | 3/2003 | Bentz | |
| 8,117,420 B2 | 2/2012 | Shen et al. | |
| 8,429,661 B1 | 4/2013 | Alfieri et al. | |

(Continued)

FOREIGN PATENT DOCUMENTS

| KR | 10-0276648 B1 | 1/2001 |
|---|---|---|
| KR | 10-2004-0059013 A | 7/2004 |
| KR | 10-2029806 B1 | 10/2019 |

OTHER PUBLICATIONS

G. Das et al., "Multiple-input single-output FIFO optical buffers with controllable fractional delay lines" Optics Express, vol. 16, Issue 26, pp. 21849-21864, Dec. 22, 2008.

(Continued)

*Primary Examiner* — Alexander Sofocleous
*Assistant Examiner* — Tracy Hampton
(74) *Attorney, Agent, or Firm* — Harness, Dickey & Pierce, P.L.C.

(57) ABSTRACT

Disclosed is a MIMO FIFO buffer circuit that reads out data flits at once as many as an internal pointer increment value. The MIMO FIFO buffer circuit includes a MIMO FIFO storage array including 'Y' storage blocks, and an internal pointer generator that generates an internal pointer based on an internal pointer increment value indicating the number of data flits to read out at once from among 'K×X' data flits stored in K storage blocks out of the 'Y' storage blocks. Each of the 'Y' and the 'K' is a natural number, and the 'K' is equal to or less than the 'Y', and each of the 'K' storage blocks stores 'X' data flits.

20 Claims, 11 Drawing Sheets

(56) References Cited

U.S. PATENT DOCUMENTS 9,436,432 B2 * 9/2016 Batra .................. G11C 7/1075
10,509,628 B1 12/2019 Babitsky et al.
2014/0149694 A1 5/2014 Lee et al.

OTHER PUBLICATIONS

Hiroyuki Goto et al., "Monitoring and Scheduling Methods for MIMOFIFO Systems Utilizing Max-Plus Linear Representation" IEMS vol. 7, No. 1, pp. 23-33, Jun. 2008.
Mohammad Ayoub Khan et al., "n-Bit multiple read and write FIFO memory model for network-on-chip", 2011 World Congress on Information and Communication Technologies.

* cited by examiner

MULTI-INPUT MULTI-OUTPUT FIRST-IN FIRST-OUT BUFFER CIRCUIT THAT READS OUT MULTIPLE DATA FLITS AT ONCE, AND ELECTRONIC CIRCUITS HAVING SAME

CROSS-REFERENCE TO RELATED APPLICATIONS

This application claims priority under 35 U.S.C. § 119 to Korean Patent Application No. 10-2022-0014453 filed on Feb. 3, 2022, in the Korean Intellectual Property Office, the disclosure of which is incorporated by reference herein in its entirety.

BACKGROUND

Example embodiments of the present disclosure described herein relate to a multi-input multi-output first-in-first-out (MIMO FIFO) buffer circuit.

In a digital circuit design, some data may be stored in a buffer (or a flip-flop) and pieces of data may be read out (or popped) in order.

In the digital circuit design, a typical FIFO buffer has a single-input single-output (SISO) structure.

A digital logic circuit frequently may use a buffer that supports multiple-input and multiple-output.

SUMMARY

Example embodiments of the present disclosure provide a MIMO FIFO buffer circuit capable of reading out data flits at once based on the internal pointer increment value from data flits stored in one storage block or reading out data flits at once from data flits stored in a plurality of storage blocks, and an electronic circuit including the same.

According to an example embodiment, a multi-input multi-output first-in-first-out (MIMO FIFO) buffer circuit includes a MIMO FIFO storage array including 'Y' storage blocks, and an internal pointer generator configured to generate an internal pointer based on an internal pointer increment value indicating the number of data flits to read out at once from among 'K×X' data flits stored in K storage blocks out of the 'Y' storage blocks. Each of the 'Y' and the 'K' is a natural number, and the 'K' is equal to or less than the 'Y', and each of the 'K' storage blocks stores 'X' data flits.

The MIMO FIFO buffer circuit further includes a readout control logic circuit. In response to the internal pointer increment value being expressed as $2^N$, the readout control logic circuit is configured to compare $2^N$ with the 'X', read out a number of data flits at once corresponding to the internal pointer increment value starting from a data flit indicated by the internal pointer from among the 'X' data flits stored in only the one storage block out of the 'K' storage blocks, in response to $2^N$ being equal to or less than the 'X', and read out the number of data flits corresponding to the internal pointer increment value starting from a data flit indicated by the internal pointer from among the 'K×X' data flits stored in the 'K' storage blocks, in response to $2^N$ being greater than the 'X'. The 'N' is a natural number.

The readout control logic circuit is configured to increase a next output pointer by "+A" immediately after a readout operation is completely performed on only the one storage block, the next output pointer indicating a location in the storage blocks at which data is to be read in response to $2^N$ being equal to or less than the 'X', in response to $2^N$ being greater than the 'X' increase the next output pointer by "+B" immediately after reading out the number of data flits at once corresponding to the internal pointer increment value starting from the data flit indicated by the internal pointer from among the 'K×X' data flits stored in the 'K' storage blocks. The 'B' is greater than the 'A'.

According to an example embodiment, a data processing circuit includes a storage array including 'Y' storage blocks, a write control logic circuit that receives 'X' data flits output from each of 'K' data packet generation circuits and writes the 'X' data flits to each of 'K' storage blocks among the 'Y' storage blocks, and a readout circuit that reads out the number of data flits at once corresponding to an internal pointer increment value starting from a first data flit, which is specified by an output pointer and an internal pointer, from among 'K×X' data flits stored in the 'K' storage blocks. Each of the 'Y' and the 'K' is a natural number, and the 'K' is equal to or less than the 'Y'.

According to an example embodiment, a data processing system includes 'K' data packet generation circuits, each of which is configured to generate a data packet including 'X' data flits and a data processing circuit connected to the 'K' data packet generation circuits. The data processing circuit includes a MIMO FIFO buffer circuit. The MIMO FIFO buffer circuit includes a storage array including 'Y' storage blocks, a write control logic circuit configured to receive 'X' data flits output from the each of 'K' data packet generation circuits and write the 'X' data flits to each of 'K' storage blocks among the 'Y' storage blocks, and a readout circuit configured to read out the number of data flits at once corresponding to an internal pointer increment value starting from a first data flit specified by an output pointer and an internal pointer, from among 'K×X' data flits stored in the 'K' storage blocks. Each of the 'Y' and the 'K' is a natural number, and the 'K' is equal to or less than the 'Y'.

BRIEF DESCRIPTION OF THE FIGURES

The above and other objects and features of the present disclosure will become apparent by describing in detail example embodiments thereof with reference to the accompanying drawings.

DETAILED DESCRIPTION

Figure 1:
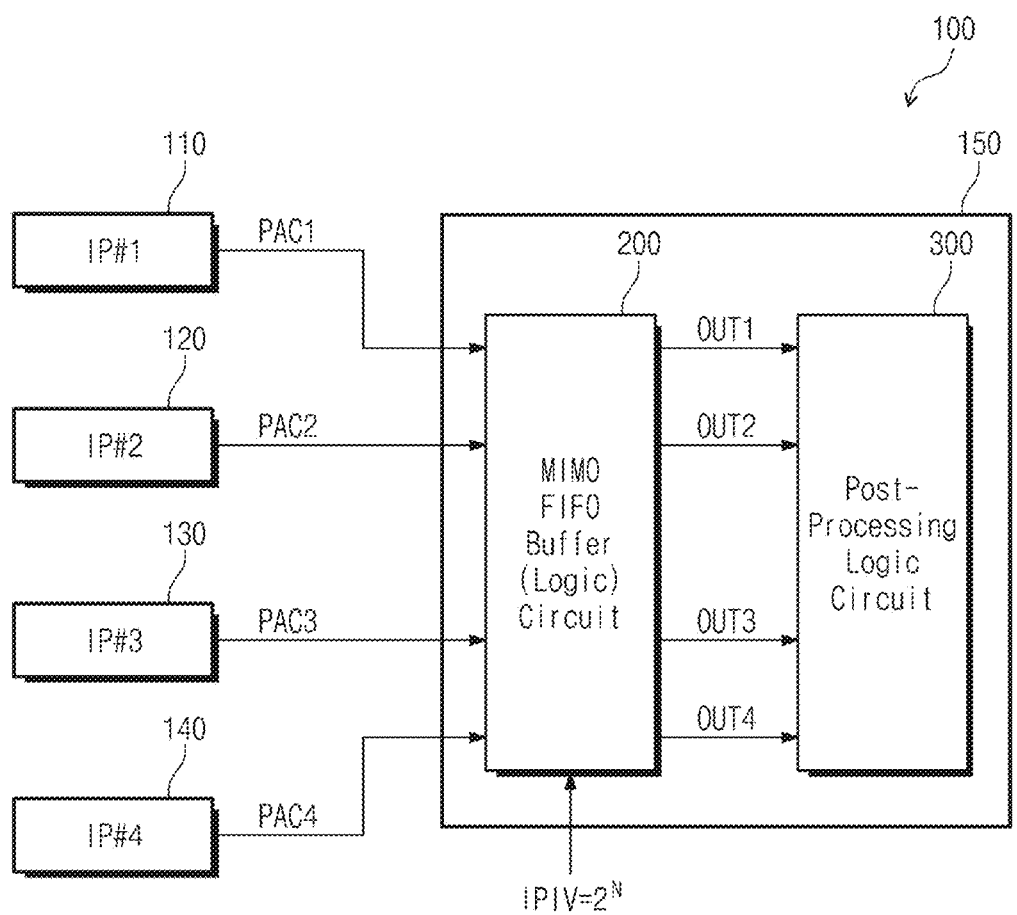
FIG. 1 is a block diagram of a data processing system including a data processing circuit including a MIMO FIFO buffer circuit, according to some example embodiments of the present disclosure.

FIG. 1 is a block diagram of a data processing system including a data processing circuit including a MIMO FIFO buffer circuit, according to some example embodiments of the present disclosure.

Referring to FIG. 1, a data processing system 100 includes a plurality of data packet generation circuits 110, 120, 130, and 140, and a data processing circuit 150.

The data processing system 100 may be an intellectual property (IP), a system on chip (SoC), an integrated circuit (IC), a central processing unit (CPU), a graphics processing unit (GPU), or general-purpose computing on graphics processing units (GPGPU).

Each of the circuits 110, 120, 130, 140, and 150 may be a digital logic circuit, IP, or IC, but is not limited thereto. The IP may be a logic circuit used to fabricate a field programmable gate array (FPGA) for a product or an application-specific integrated circuit (ASIC) for a product.

The data packet generation circuits 110, 120, 130, and 140 may generate data packets PAC1, PAC2, PAC3, and PAC4, respectively. The data processing circuit 150 may read out data flits at once based on an internal pointer increment value IPIV from among a plurality of data flits included in each of the data packets PAC1, PAC2, PAC3, and PAC4. The internal pointer increment value IPIV may indicate how many data flits are read out at once and the data processing circuitry may read out the number of data flits indicated in the internal pointer increment value IPIV.

The internal pointer increment value IPIV may be expressed as $2^N$. Here, 'N' may be 0 (zero) or a natural number. The internal pointer increment value IPIV may be set or programmed by the outside of the data processing circuit 150.

The data processing circuit 150 includes a MIMO FIFO buffer circuit 200 and a post-processing logic circuit 300. The data processing system 100 may have advantages over previous systems. Some of these advantages may include improved processing speeds and/or reduced latency because the data processing circuit 150 reading out multiple data flits at once and the MIMO FIFO buffer circuit 200 being able to buffer multiple inputs at once allows the data processing system 100 to manage and process data flits faster than previous systems. For example, the data processing system 100 may have reduced latency over a system using a single input buffer such as a single-input single-output first-in-first-out (SISO FIFO) buffer. Using the MIMO FIFO buffer circuit 200, multiple data flits may be processed concurrently allowing processes using the data flits to be performed without delays associated with reading the data flits sequentially.

The MIMO FIFO buffer circuit 200 is also referred to as an "MIMO FIFO buffer", "MIMO FIFO buffer logic circuit", "MIMO FIFO memory buffer", or "MIMO FIFO memory device".

The MIMO FIFO buffer circuit 200 to be described with reference to FIG. 2 includes a MIMO FIFO storage array 230 including 'Y' storage blocks, each of which stores 'X' data flits, and a readout circuit 240.

The readout circuit 240 may read out data flits at once as many as an internal pointer increment value IPIV starting from a data flit, which is specified by an output pointer OPT and an internal pointer ITLP, from among 'K×X' data flits stored in 'K' storage blocks. That is, the readout circuit 240 may divide data flits into the desired number of data flits among 'X' data flits based on the internal pointer increment value IPIV and may read out the divided data flits.

The readout circuit 240 includes an internal pointer generator 250. The internal pointer generator 250 generates the internal pointer ITLP by using (or alternatively, based on) the internal pointer increment value IPIV indicating the number of data flits read out (this is also referred to as "pop") at once from among 'K×X' data flits stored in 'K' register blocks out of 'Y' register blocks. Here, each of 'K', 'X', and 'Y' are a natural number. For convenience of description, it is assumed that 'K' is 3, 'X' is 4, and 'Y' is 5.

The data flit (this is also referred to as a "flit") described in this specification is also referred to as a "data unit". For example, the data flit may have Z-bits, and 'Z' may be 128 or 256, but is not limited thereto.

In computer networking, a data flit (this is also referred to as a "flow control unit" or "flow control digit") refers to a link-level atomic piece that forms a network packet or stream.

The first flit, which is also called a "header flit", includes information about a packet's route (i.e., a destination address) and sets up a routing behavior for all subsequent flits associated with the packet.

Figure 3:
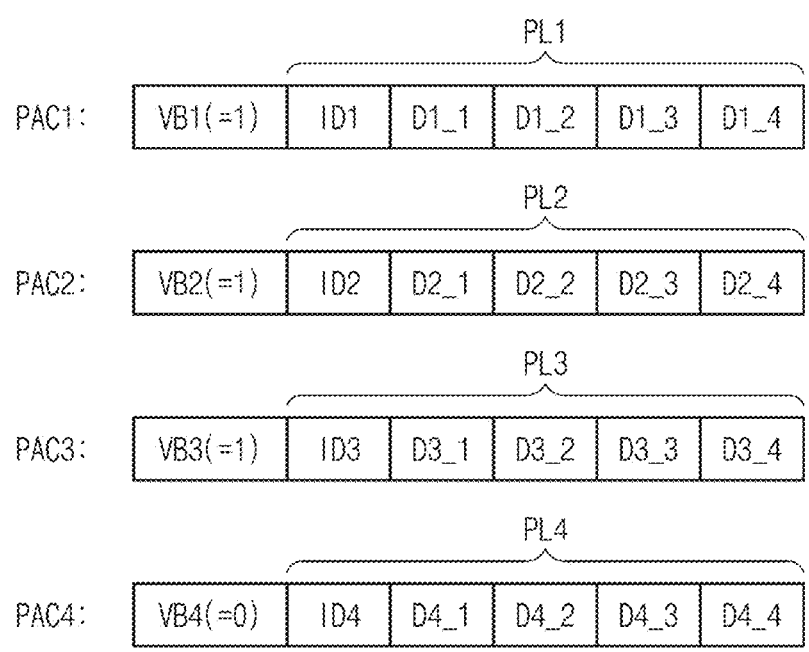
FIG. 3 shows an example embodiment of input data packets of the MIMO FIFO buffer circuit shown in FIG. 2.

In this specification, the header flit may correspond to identification information ID1, ID2, ID3, or ID4 shown in FIG. 3, and the all subsequent flits may correspond to data flits D1_1 to D1_4, D2_1 to D2_4, D3_1 to D3_4, or D4_1 to D4_4, which are included in the data packet PAC1, PAC2, PAC3, and PAC4, respectively.

The post-processing logic circuit 300 receives and processes output data OUT1, OUT2, OUT3, and OUT4 including outputting the number of data flits corresponding to the internal pointer increment value IPIV at once from the MIMO FIFO buffer circuit 200.

The structure and operation of the MIMO FIFO buffer circuit 200 will be described in detail with reference to FIGS. 2 to 11.

Figure 2:
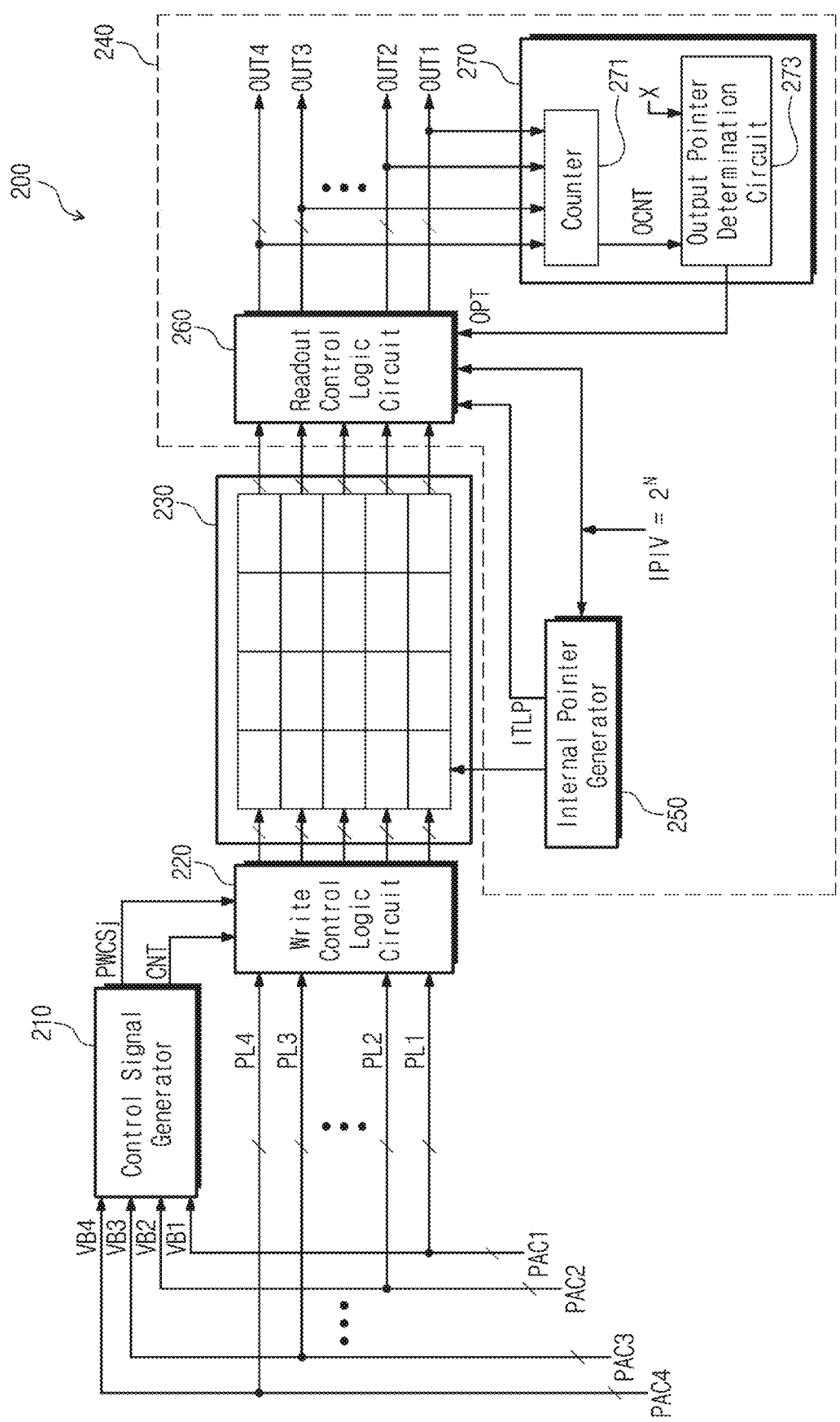
FIG. 2 is a circuit diagram of the MIMO FIFO buffer circuit shown in FIG. 1.

FIG. 2 is a circuit diagram of the MIMO FIFO buffer circuit shown in FIG. 1. FIG. 3 shows an example embodiment of input data packets of the MIMO FIFO buffer circuit shown in FIG. 2.

An input pointer (this is also referred to as a "write pointer") always indicates a next location of storage at which data is to be written, and an output pointer (this is also referred to as a "read pointer") always indicates a current location of storage at which data is to be read. Here, the location refers to an address for specifying a storage area where data is to be written or read.

When a reset operation is performed, each of the input pointer and the output pointer is reset to zero. When the input pointer is equal to the output pointer, the corresponding storage is empty.

The MIMO FIFO buffer circuit 200 includes a control signal generator 210, a write control logic circuit 220 (this is also referred to as an "input mask circuit"), the MIMO FIFO storage array 230, and the readout circuit 240. The readout circuit 240 (this is also referred to as an "output mask circuit") includes the internal pointer generator 250, a readout control logic circuit 260, and an output pointer generator 270.

Referring to FIGS. 1 to 3, the first data packet PAC1 output from the first data packet generation circuit 110 includes a first valid bit VB1 having logic 1 and first data PL1. The first data PL1 includes first identification information ID1 and four data flits D1_1, D1_2, D1_3, and D1_4.

The second data packet PAC2 output from the second data packet generation circuit 120 includes a second valid bit VB2 having logic 1 and second data PL2. The second data PL2 includes second identification information ID2 and four data flits D2_1, D2_2, D2_3, and D2_4.

The third data packet PAC3 output from the third data packet generation circuit 130 includes a third valid bit VB3 having logic 1 and third data PL3. The third data PL3 includes third identification information ID3 and four data flits D3_1, D3_2, D3_3, and D3_4.

The fourth data packet PAC4 output from the fourth data packet generation circuit 140 includes a fourth valid bit VB4 having logic 0 and fourth data PL4. The fourth data PL4 includes fourth identification information ID4 and four data flits D4_1, D4_2, D4_3, and D4_4.

The pieces of identification information ID1 to ID4 include unique information about the data packets PAC1 to PAC4, respectively.

The control signal generator 210 performs a function of generating a count value CNT and a function of generating a data packet write control signal PWCSj. In FIG. 2, 'j' has a value between 1 and 4.

When generating the count value CNT, the control signal generator 210 determines whether the logic of each of the valid bits VB1, VB2, VB3, and VB4 respectively included in data packets PAC1, PAC2, PACS, and PAC4 corresponds to 1 (one) or 0 (zero), counts the number of valid bits VB1, VB2, and VB3, each of which has logic 1, and generates the count value CNT depending on the count result.

As shown in FIG. 3, because the logic of each of the valid bits VB1, VB2, and VB3 is 1 and only the logic of the fourth valid bit VB4 is 0, the control signal generator 210 outputs the count value CNT of 3.

Furthermore, when generating the data packet write control signal PWCSj, the control signal generator 210 generates a first data packet write control signal (PWCSj, j=1) in response to the first valid bit VB1 having logic 1, generates a second data packet write control signal (PWCSj, j=2) in response to the second valid bit VB2 having logic 1, generates a third data packet write control signal (PWCSj, j=3) in response to the third valid bit VB3 having logic 1, and generates a fourth data packet write control signal (PWCSj, j=4) in response to the fourth valid bit VB4 having logic 0.

Figure 4:
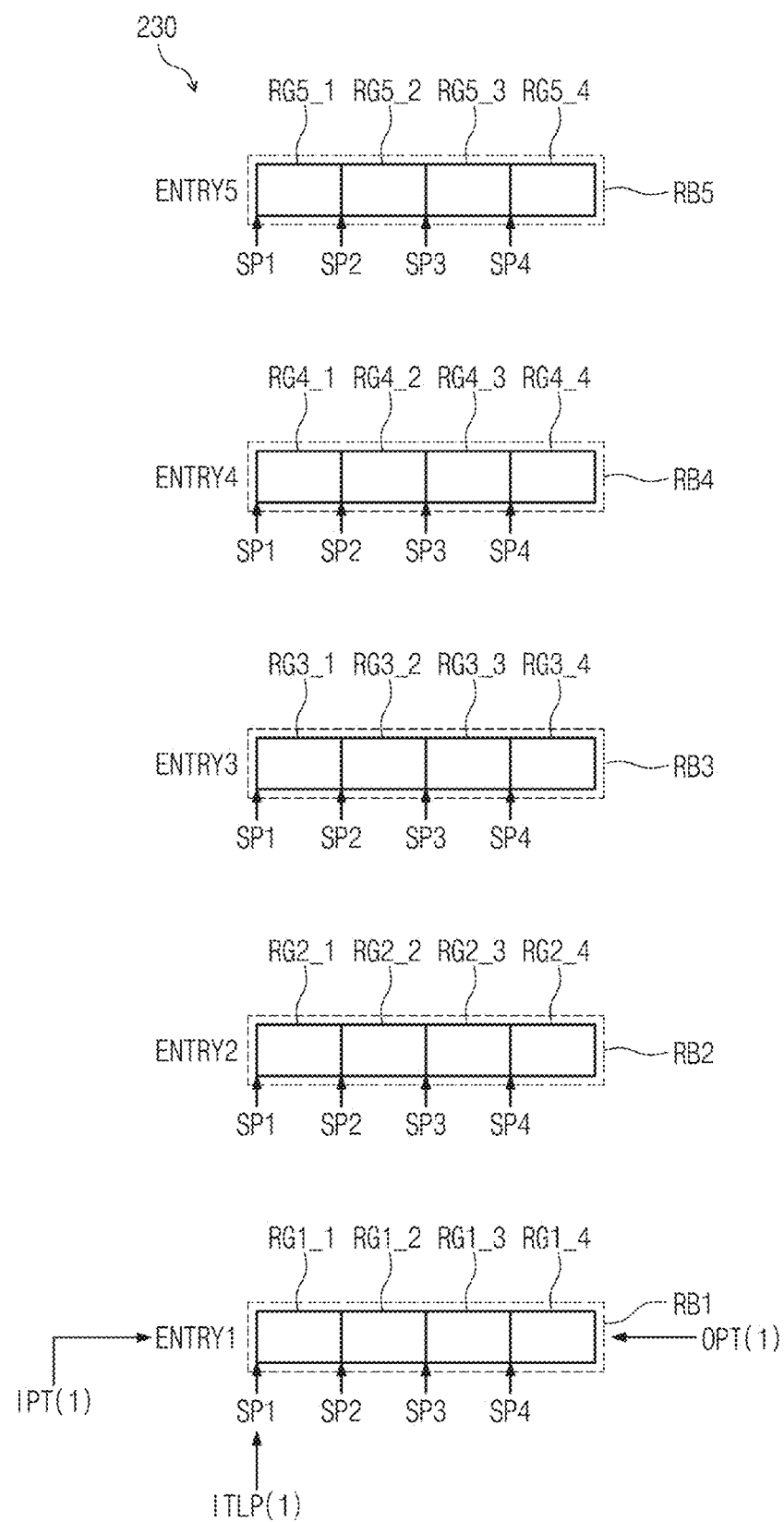
FIG. 4 shows a state of a MIMO FIFO register array before input data packets are entered into the MIMO FIFO buffer circuit shown in FIG. 2.

FIG. 4 shows a state of a MIMO FIFO register array before input data packets are entered into the MIMO FIFO buffer circuit shown in FIG. 2.

Referring to FIGS. 2 to 4, the MIMO FIFO storage array 230 includes a plurality of storages, each of which stores a plurality of data flits. The plurality of storages (or data storages) include static random access memories (SRAMs), flip-flops, latches, registers, or other types of storage hardware suitable for storing the data flits. Hereinafter, for convenience of description, it is assumed that the MIMO FIFO storage array 230 is a MIMO FIFO register array including a plurality of registers.

The MIMO FIFO register array 230 includes five register blocks RB1 to RB5, and each of the register blocks RB1 to RB5 includes four register groups. Each of the register groups stores each data flit.

The first register block RB1 corresponding to a first entry ENTRY1 includes four register groups RG1_1 to RG1_4; the second register block RB2 corresponding to a second entry ENTRY2 includes four register groups RG2_1 to RG2_4; the third register block RB3 corresponding to a third entry ENTRY3 includes four register groups RG3_1 to RG3_4; the fourth register block RB4 corresponding to a fourth entry ENTRY4 includes four register groups RG4_1 to RG4_4; and the fifth register block RB5 corresponding to a fifth entry ENTRY5 includes four register groups RG5_1 to RG54. Each of the register groups includes a plurality of registers.

Initially, a current input pointer ITP(1) indicates the first register block RB1; a current intermediate pointer ITLP(1) indicates a first start location SP1 of the first register group RG1_1 of the first register block RB1; and a current output pointer OPT(1) indicates the first register block RB1.

The first start location SP1 indicates a start location (e.g., an address of the first register in each of the first register groups RG1_1, RG2_1, RG3_1, RG4_1, and RG5_1) of each of the first register groups RG1_1, RG2_1, RG3_1, RG4_1, and RG5_1; a second start location SP2 indicates a start location (e.g., an address of the first register in each of the second register groups RG1_2, RG2_2, RG3_2, RG4_2, and RG5_2) of each of the second register groups RG1_2, RG2_2, RG3_2, RG4_2, and RG5_2; a third start location SP3 indicates a start location (e.g., an address of the first register in each of the third register groups RG1_3, RG2_3, RG3_3, RG4_3, and RG5_3) of each of the third register groups RG1_3, RG2_3, RG3_3, RG4_3, and RG5_3; and a fourth start location SP4 indicates a start location (e.g., an address of the first register in each of the fourth register groups RG1_4, RG2_4, RG3_4, RG4_4, and RG5_4) of each of the fourth register groups RG1_4, RG2_4, RG3_4, RG4_4, and RG5_4. For example, each of the start locations SP1 to SP4 may refer to an address of the first register at which the first bit of each data flit is stored.

Figure 5:
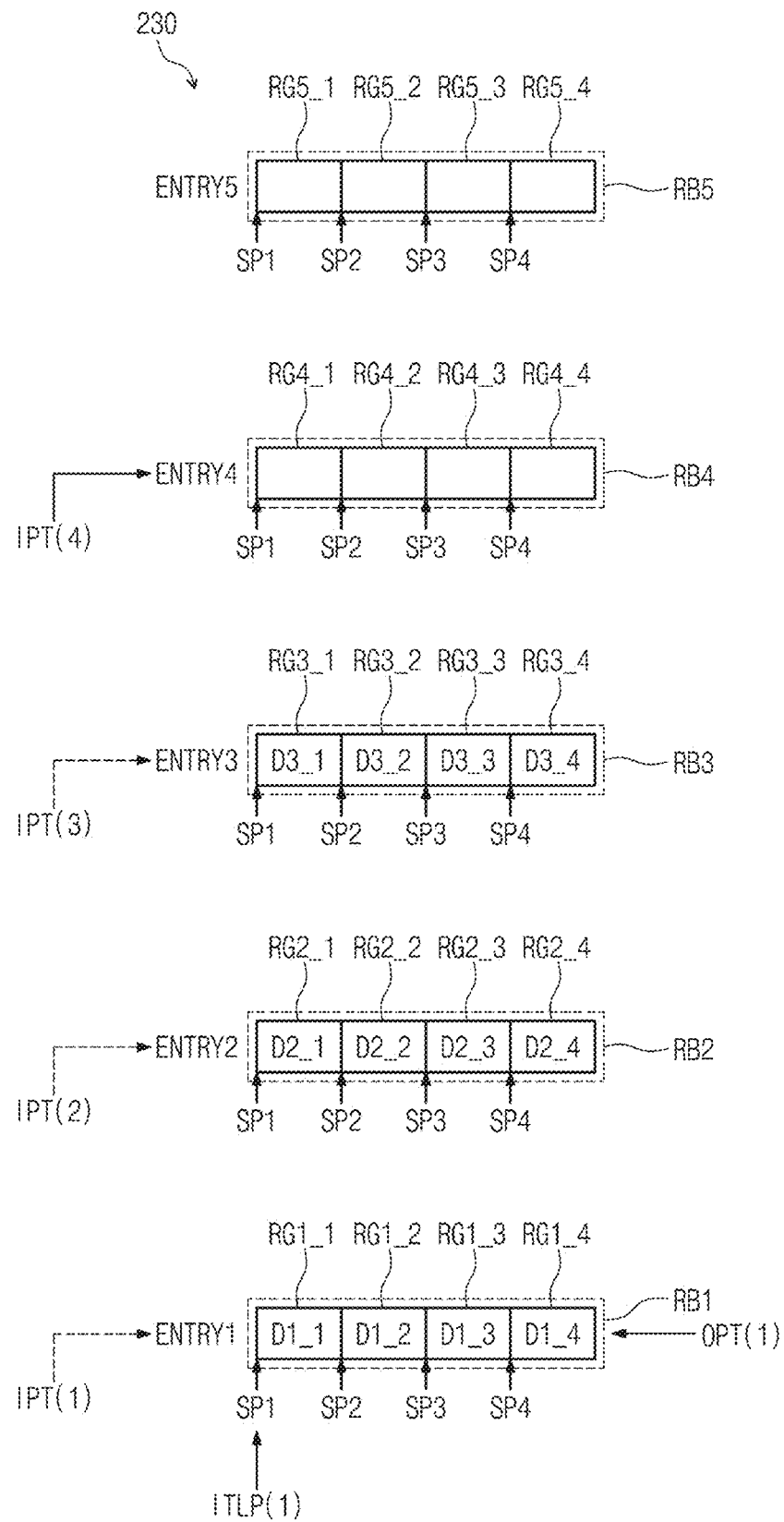
FIG. 5 shows a state of a MIMO FIFO register array after input data packets are entered into the MIMO FIFO buffer circuit shown in FIG. 2.

FIG. 5 shows a state of a MIMO FIFO register array after input data packets are entered into the MIMO FIFO buffer circuit shown in FIG. 2.

Referring to FIGS. 2 to 5, the write control logic circuit 220 writes (this is also referred to as "push") the data flits D1_1, D1_2, D1_3, and D1_4 included in the first input data packet PAC1 to the register groups RG1_1, RG1_2, RG1_3, and RG1_4 included in the first register block RB1 indicated by the current input pointer IPT(1) in response to the first data packet write control signal PWCS1 generated depending on the first valid bit VB1 having logic 1, respectively. When a write operation is completely performed on each of the data flits D1_1, D1_2, D1_3, and D1_4, the write control logic circuit 220 generates the next input pointer IPT(2) indicating the second register block RB2 by adding "+1" to the current input pointer IPT(1). In other words, IPT(2) is obtained through "IPT(1)+1".

Next, the write control logic circuit 220 writes the data flits D2_1, D2_2, D2_3, and D2_4 included in the second input data packet PAC2 to the register groups RG2_1, RG2_2, RG2_3, and RG2_4 included in the second register block RB2 indicated by the current input pointer IPT(2) in response to the second data packet write control signal PWCS2 generated depending on the second valid bit VB2 having logic 1, respectively. When a write operation is completely performed on each of the data flits D2_1, D2_2, D2_3, and D2_4, the write control logic circuit 220 generates the next input pointer IPT(3) indicating the third register block RB3 by adding "+1" to the current input pointer IPT(2). In other words, IPT(3) is obtained through "IPT(2)+1".

Next, the write control logic circuit 220 writes the data flits D3_1, D3_2, D3_3, and D3_4 included in the third input data packet PAC3 to the register groups RG3_1, RG3_2, RG3_3, and RG3_4 included in the third register block RB3 indicated by the current input pointer IPT(3) in response to the third data packet write control signal PWCS3 generated depending on the third valid bit VB3 having logic 1, respectively. When a write operation is completely performed on each of the data flits D3_1, D3_2, D3_3, and D3_4, the write control logic circuit 220 generates the next input pointer IPT(4) indicating the fourth register block RB4 by adding "+1" to the current input pointer IPT(3). In other words, IPT(4) is obtained through "IPT(3)+1".

In terms of the count value CNT, IPT(4) denotes "IPT(1)+CNT", and the count value CNT is 3.

However, the write control logic circuit 220 does not write the data flits D4_1, D4_2, D4_3, and D4_4 included in the fourth input data packet PAC4 to the register groups RG4_1, RG4_2, RG4_3, and RG4_4 included in the fourth register block RB4 indicated by the current input pointer IPT(4) in response to the fourth data packet write control signal PWCS4 generated depending on the fourth valid bit VB4 having logic 0, respectively. For example, each of the data flits D4_1, D4_2, D4_3, and D4_4 is flushed.

Figure 6:
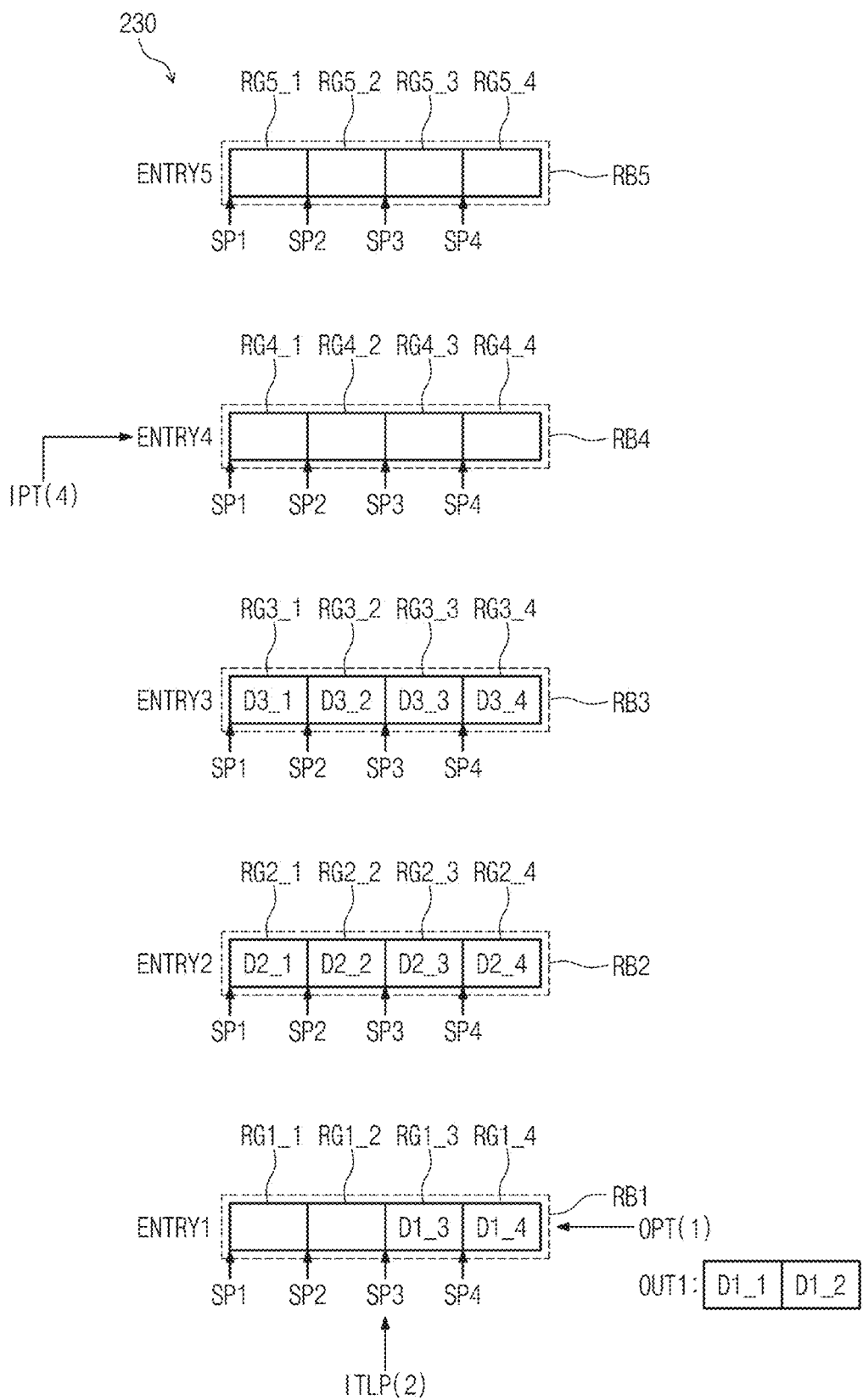
FIG. 6 shows a state of a MIMO FIFO register array after data flits are read at once based on an internal pointer increment value from among data flits stored in a first register block of the MIMO FIFO buffer circuit shown in FIG. 2.

FIG. 6 shows a state of a MIMO FIFO register array after data flits are read at once as many as an internal pointer increment value from among data flits stored in a first register block of the MIMO FIFO buffer circuit shown in FIG. 2.

Referring to FIG. 2, the readout circuit 240 includes the internal pointer generator 250, the readout control logic circuit 260, and the output pointer generator 270.

The internal pointer generator 250 generates the internal pointer ITLP by using (or alternatively, based on) the internal pointer increment value IPIV.

It is assumed that the MIMO FIFO buffer circuit 200 to be described with reference to FIGS. 5 to 8 uses the internal pointer increment value IPIV of 2. Accordingly, IPIV, that is, $2^{(N-1)}$ is 2, and thus the readout circuit 240 reads out two data flits among four data flits at once depending on the internal pointer increment value (IPIV=$2^1$=2).

Referring to FIGS. 5 and 6, the readout control logic circuit 260 may read out the data flits D1_1 and D1_2 at once as many as the number (2 (two)) corresponding to the internal pointer increment value IPIV starting from the data flit D1_1, which is indicated by the current output pointer OPT(1) indicating the first register block RB1 and the current internal pointer ITLP(1) indicating the first start location SP1, from among the '3×4' data flits D1_1 to D1_4, D2_1 to D2_4, and D3_1 to D3_4 stored in the three register blocks RB1, RB2, and RB3, and may output the two data flits D1_1 and D1_2 as the first output signal OUT1.

When the two data flits D1_1 and D1_2 are completely read out, the internal pointer generator 250 generates the next internal pointer ITLP(2) indicating the third start location SP3 by adding the internal pointer increment value IPIV (i.e., +2) to the current internal pointer ITLP(1). That is, ITLP(2) is obtained through "ITLP(1)+IPIV".

The output pointer generator 270 compares the number OCNT of data flits included in the first output signal OUT1 with the number (X) of data flits stored for each register block, and may determine whether to maintain or change the current output pointer OPT(1) depending on the comparison result.

The output pointer generator 270 includes a counter 271 and an output pointer determination circuit 273.

The counter 271 receives the first output signal OUT1 including the two data flits D1_1 and D1_2, counts the number of two data flits D1_1 and D1_2 included in the first output signal OUT1, and maintains the output count value OCNT of 2 until a reset operation is performed.

When the output count value (OCNT=2) is less than the number (X=4) of data flits stored for each register block, the output pointer determination circuit 273 maintains the current output pointer OPT(1) as it is.

Figure 8:
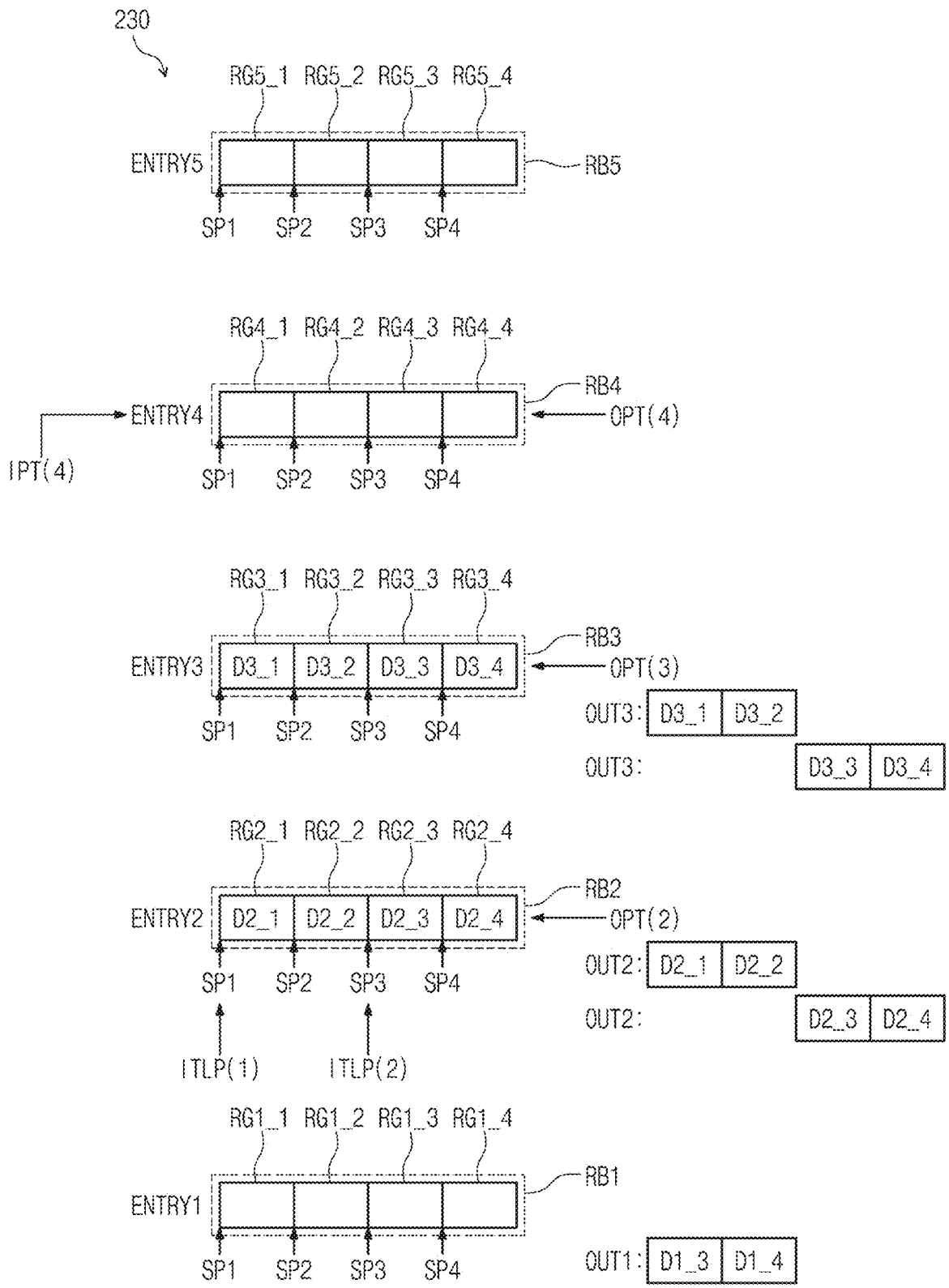
FIG. 8 shows a state of a MIMO FIFO register array for describing a process of reading out data flits stored in each register block of the MIMO FIFO buffer circuit shown in FIG. 2.

Referring to FIGS. 6 and 8, the readout control logic circuit 260 may read out the data flits D1_3 and D1_4 at once, the number (2) of data flits corresponding to the internal pointer increment value IPIV starting from the data flit D1_3, which is specified by the current output pointer OPT(1) indicating the first register block RB 1 and the current internal pointer ITLP(2) indicating the third start location SP3, from among the two remaining data flits D1_3 and D1_4 stored in the first register block RB1 and may output the two data flits D1_3 and D1_4 to the first output signal OUT1.

When the two data flits D1_3 and D1_4 are completely read out, the internal pointer generator 250 generates the next internal pointer ITLP(1) indicating the first start location SP1 by adding the internal pointer increment value IPIV (i.e., +2) to the current internal pointer ITLP(2). That is, ITLP(1) is obtained through "ITLP(2)+IPIV".

The counter 271 further receives the first output signal OUT1 including the two data flits D1_3 and D1_4, and outputs the output count value OCNT of 4 by further counting the number of two data flits D1_3 and D1_4.

When the output count value (OCNT=4) is equal to the number (X=4) of data flits stored for each register block, the output pointer determination circuit 273 generates the next output pointer OPT(2) indicating the second register block RB2 by adding '+1' to the current output pointer OPT(1). That is, OPT(2) is obtained through "OPT(1)+1".

For example, whenever the next output pointer is generated, the output pointer determination circuit 273 may generate a reset signal for resetting the counter 271.

Figure 7:
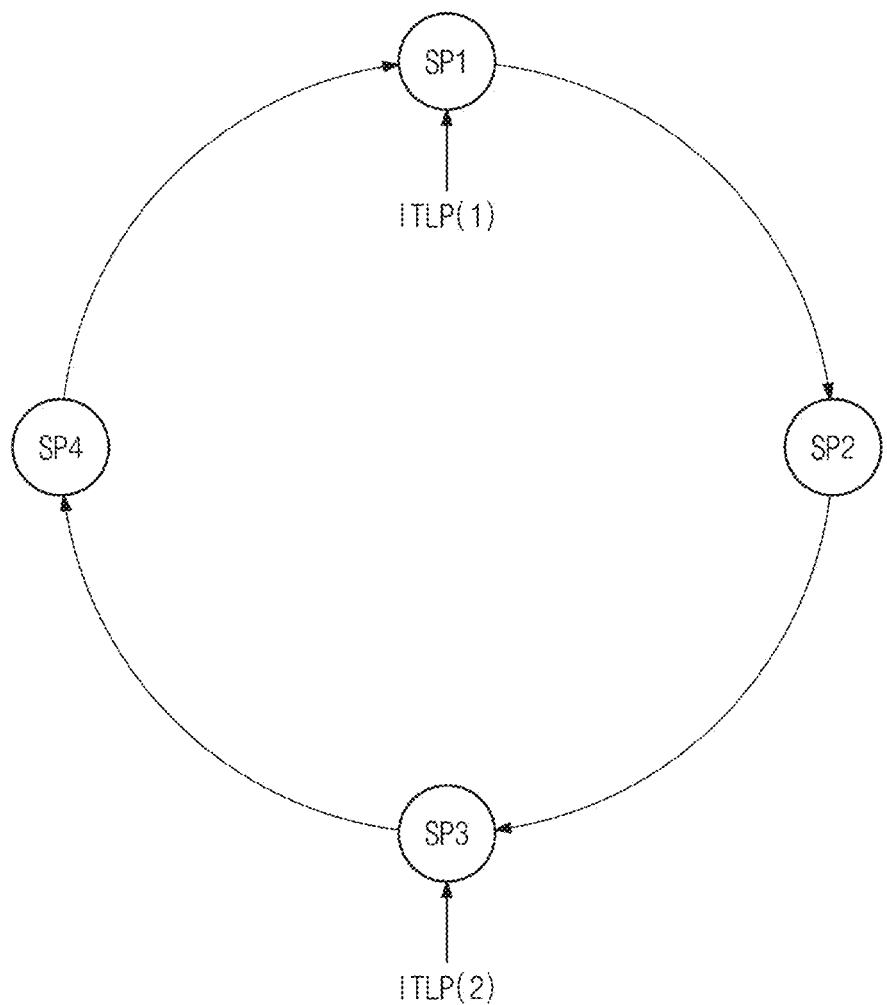
FIG. 7 is a conceptual diagram for describing a change of an internal pointer, according to some example embodiments of the present disclosure.

FIG. 7 is a conceptual diagram for describing a change of an internal pointer, according to some example embodiments of the present disclosure. The internal pointer ITLP circulates as shown in FIG. 7. For example, when 2 is added to ITLP(1), the result becomes ITLP(2). When 2 is added to ITLP(2), the result becomes ITLP(1) again. Also, when a multiple of 4 is added to ITLP(1), ITLP(1) is not changed.

FIG. 8 shows a state of a MIMO FIFO register array for describing a process of reading out data flits stored in each register block of the MIMO FIFO buffer circuit shown in FIG. 2.

Referring to FIGS. 2 and 8, the readout control logic circuit 260 may read out the data flits D2_1 and D2_2 at once, the number (2) of data flits corresponding to the internal pointer increment value IPIV starting from the data flit D2_1, which is specified by the current internal pointer ITLP(1) indicating the first start location SP1, from among the four data flits D2_1 to D2_4 stored in the second register block RB2 indicated by the current output pointer OPT(2) and may output the second output signal OUT2 including the two data flits D2_1 and D2_2.

When the two data flits D2_1 and D2_2 are completely read out, the internal pointer generator 250 generates the next internal pointer ITLP(2) indicating the third start location SP3 by adding the internal pointer increment value IPIV (i.e., +2) to the current internal pointer ITLP(1).

The counter 271 receives the second output signal OUT2 including the two data flits D2_1 and D2_2, counts the number of two data flits D2_1 and D2_2 included in the second output signal OUT2, and outputs the output count value OCNT of 2.

Because the output count value (OCNT=2) is less than the number (X=4) of data flits stored for each register block, the output pointer determination circuit 273 maintains the current output pointer OPT(2) as it is.

The readout control logic circuit 260 may read out the data flits D2_3 and D2_4 at once, the number (2) of data flits corresponding to the internal pointer increment value IPIV starting from the data flit D2_3, which is specified by the current internal pointer ITLP(2) indicating the third start location SP3, from among the two remaining data flits D2_3 to D2_4 stored in the second register block RB2 indicated by the current output pointer OPT(2) and may output the second output signal OUT2 including the two data flits D2_3 and D2_4.

When the two data flits D2_3 and D2_4 are completely read out, the internal pointer generator 250 generates the next internal pointer ITLP(1) indicating the first start location SP1 by adding the internal pointer increment value IPIV (i.e., +2) to the current internal pointer ITLP(2).

The counter 271 further receives the second output signal OUT2 including the two data flits D2_3 and D2_4, and outputs the output count value OCNT of 4 by further counting the number of two data flits D2_3 and D2_4.

Because the output count value (OCNT=4) is equal to the number (X=4) of data flits stored for each register block, the output pointer determination circuit 273 generates the next output pointer OPT(3) indicating the third register block RB3 by adding '+1' to the current output pointer OPT(2). After the next output pointer OPT(3) is generated, the counter 271 may be reset.

A process of reading out the two data flits D3_1 and D3_2 or the two data flits D3_3 and D3_4 at once from among the four data flits D3_1 to D3_4 stored in the third register block RB3 indicated by the current output pointer OPT(3) is the same as a process of reading out the two data flits D1_1 and D1_2 or the two data flits D1_3 and D1_4 at once from among the four data flits D1_1 to D1_4 stored in the first register block RB1 indicated by the current output pointer OPT(1), and thus a detailed description thereof will be omitted to avoid redundancy.

Figure 9:
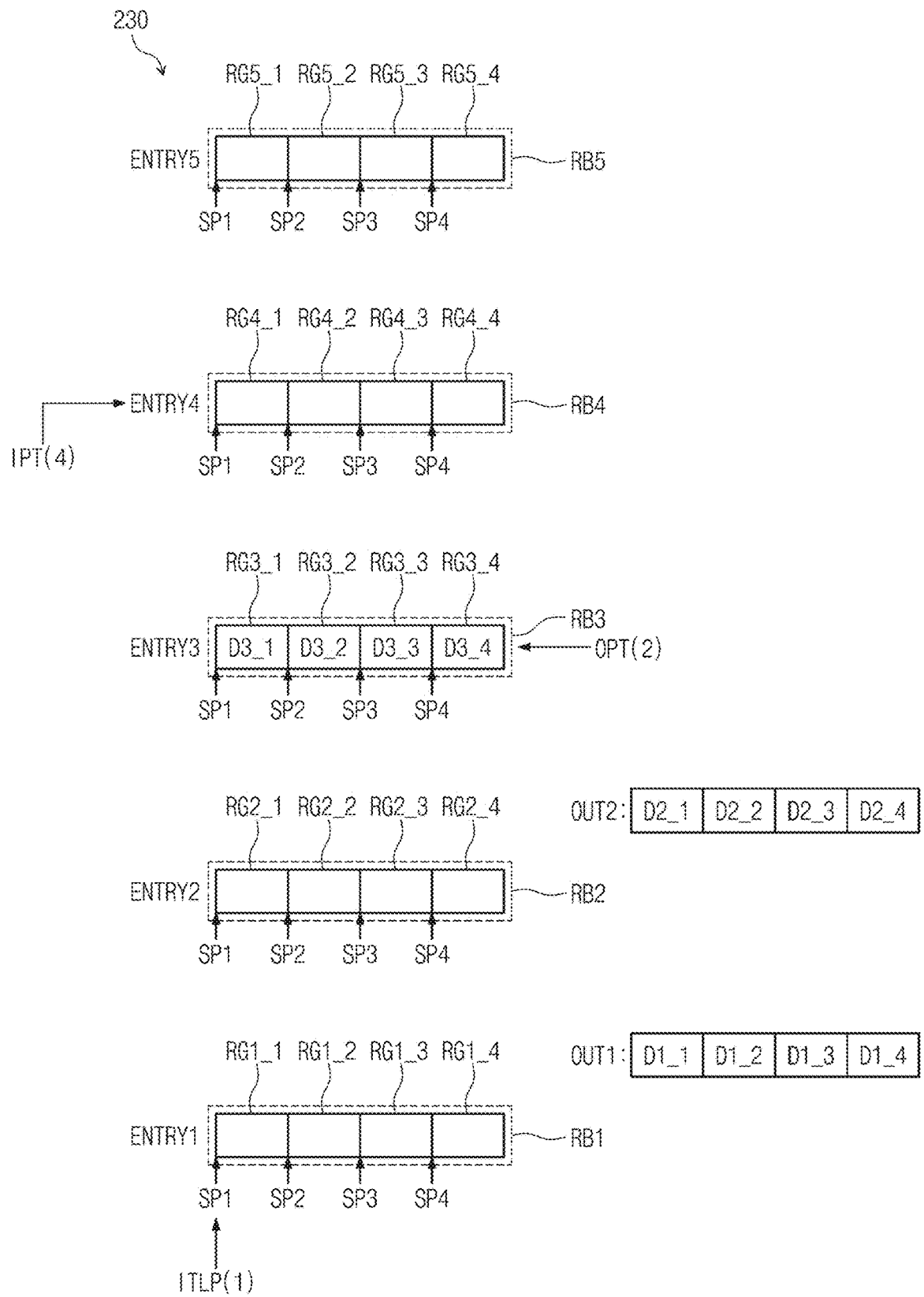
FIG. 9 shows a state of a register array after data flits are read out at once based on an internal pointer increment value. The read data flits are from among data flits stored in a plurality of register blocks of the MIMO FIFO buffer circuit shown in FIG. 2.
Figure 10:
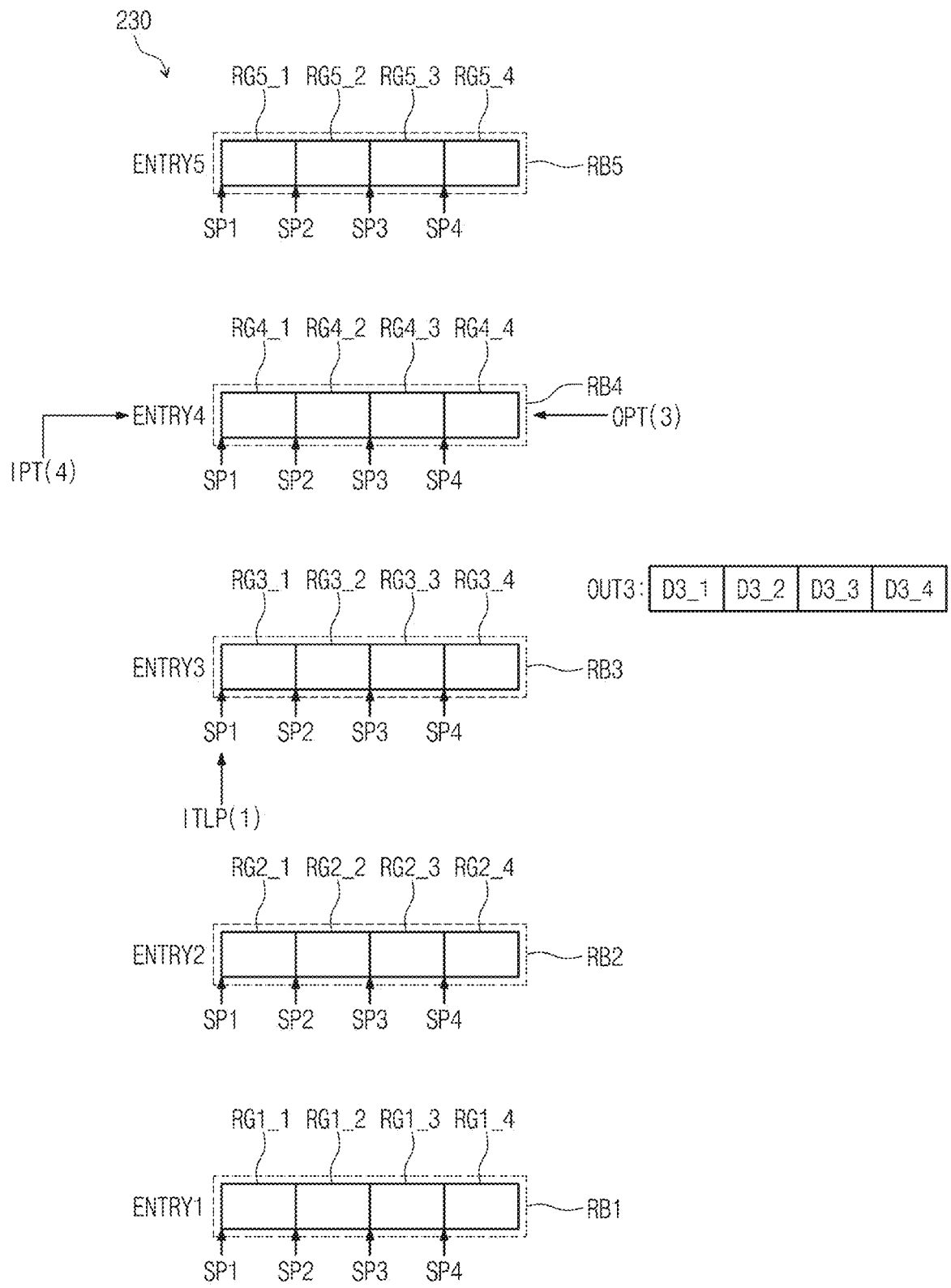
FIG. 10 shows a state of a register array after data flits stored in a register block, which were previously not read out, are read out at once. The read data flits are from among a plurality of register blocks of the MIMO FIFO buffer circuit shown in FIG. 2.

FIG. 9 shows a state of a register array after data flits are read out at once based on an internal pointer increment value. The read data flits are from among data flits stored in a plurality of register blocks of the MIMO FIFO buffer circuit shown in FIG. 2. FIG. 10 shows a state of a register array after data flits stored in a register block, which were previously not read out, are read out at once. The read data flits are from among a plurality of register blocks of the MIMO FIFO buffer circuit shown in FIG. 2.

It is assumed that the MIMO FIFO buffer circuit 200 to be described with reference to FIGS. 2, 3, 4, 5, 7, 9, and 10 uses the internal pointer increment value IPIV of 8. IPIV, that is, $2^{(N=3)}$ is 8. Accordingly, when the number of data flits stored in the MIMO FIFO register array 230 is a multiple of the internal pointer increment value (IPIV=$2^3$=8), the readout circuit 240 may read out eight data flits at once depending on the internal pointer increment value (IPIV=$2^3$=8).

However, when the number of data flits stored in the MIMO FIFO register array 230 is not a multiple of the internal pointer increment value (IPIV=8), data flits of which the number is less than the internal pointer increment value (IPIV=8) may be read out at once in a last readout operation.

Referring to FIGS. 9 and 10, the readout control logic circuit 260 may read out the data flits D1_1 to D1_4 and D2_1 to D2_4 at once. The number (8) of data flits corresponding to the internal pointer increment value IPIV starting from the data flit D1_1, which is indicated by the current output pointer OPT(1) indicating the first register block RB1 and the current internal pointer ITLP(1) indicating the first start location SP1, from among the '3×4' data flits D1_1 to D1_4, D2_1 to D2_4, and D3_1 to D3_4 stored in the three register blocks RB1, RB2, and RB3. the readout control logic circuit 260. may output the first output signal OUT1 including the four data flits D1_1 to D1_4, and may output the second output signal OUT2 including the four data flits D2_1 to D2_4.

When the eight data flits D1_1 to D1_4 and D2_1 to D2_4 are completely read out, the internal pointer generator 250 generates the next internal pointer ITLP(1) indicating the first start location SP1 by adding the internal pointer increment value IPIV (i.e., +8) to the current internal pointer ITLP(1). That is, ITLP(1) is obtained through "ITLP(1)+IPIV".

The counter 271 receives the first output signal OUT1 including the four data flits D1_1 to D1_4 and the second output signal OUT2 including the four data flits D2_1 to D2_4, counts the number of eight data flits D1_1 to D1_4 and D2_1 to D2_4, and outputs the output count value OCNT of 8.

The output pointer determination circuit 273 divides the output count value (OCNT=8) by the number (X=4) of data flits stored for each register block and generates a quotient (2). The output pointer determination circuit 273 generates the next output pointer OPT(2) indicating the third register block RB3 by adding the quotient (i.e., 2) to the current output pointer OPT(1). That is, OPT(2) is obtained through "OPT(1)+2".

After the next output pointer OPT(2) is generated, the counter 271 may be reset.

Next, the readout control logic circuit 260 may read out the four data flits D3_1 and D3_4 at once starting from the data flit D3_1, which is specified by the current internal pointer ITLP(1) indicating the first start location SP1, from among the four data flits D3_1 to D3_4 stored in the third register block RB3 indicated by the next output pointer OPT(2) and may output the third output signal OUT3 including the four data flits D3_1 and D3_4.

When the four data flits D3_1 to D3_4 are completely read out, the internal pointer generator 250 generates the next internal pointer ITLP(1) indicating the first start location SP1 by adding the internal pointer increment value IPIV (i.e., +8) to the current internal pointer ITLP(1). That is, ITLP(1) is obtained through "ITLP(1)+IPIV".

The counter 271 receives the third output signal OUT3 including the four data flits D3_1 and D3_4 and outputs the output count value OCNT of 4 by counting the number of four data flits D3_1 and D3_4.

The output pointer determination circuit 273 divides the output count value (OCNT=4) by the number (X=4) of data flits stored in one register block and generates a quotient.

The output pointer determination circuit 273 generates the next output pointer OPT(3) indicating the fourth register block RB4 by adding the quotient (i.e., 1) to the current output pointer OPT(2). That is, OPT(3) is obtained through "OPT(2) ++1".

After the next output pointer OPT(3) is generated, the counter 271 may be reset.

Figure 11:
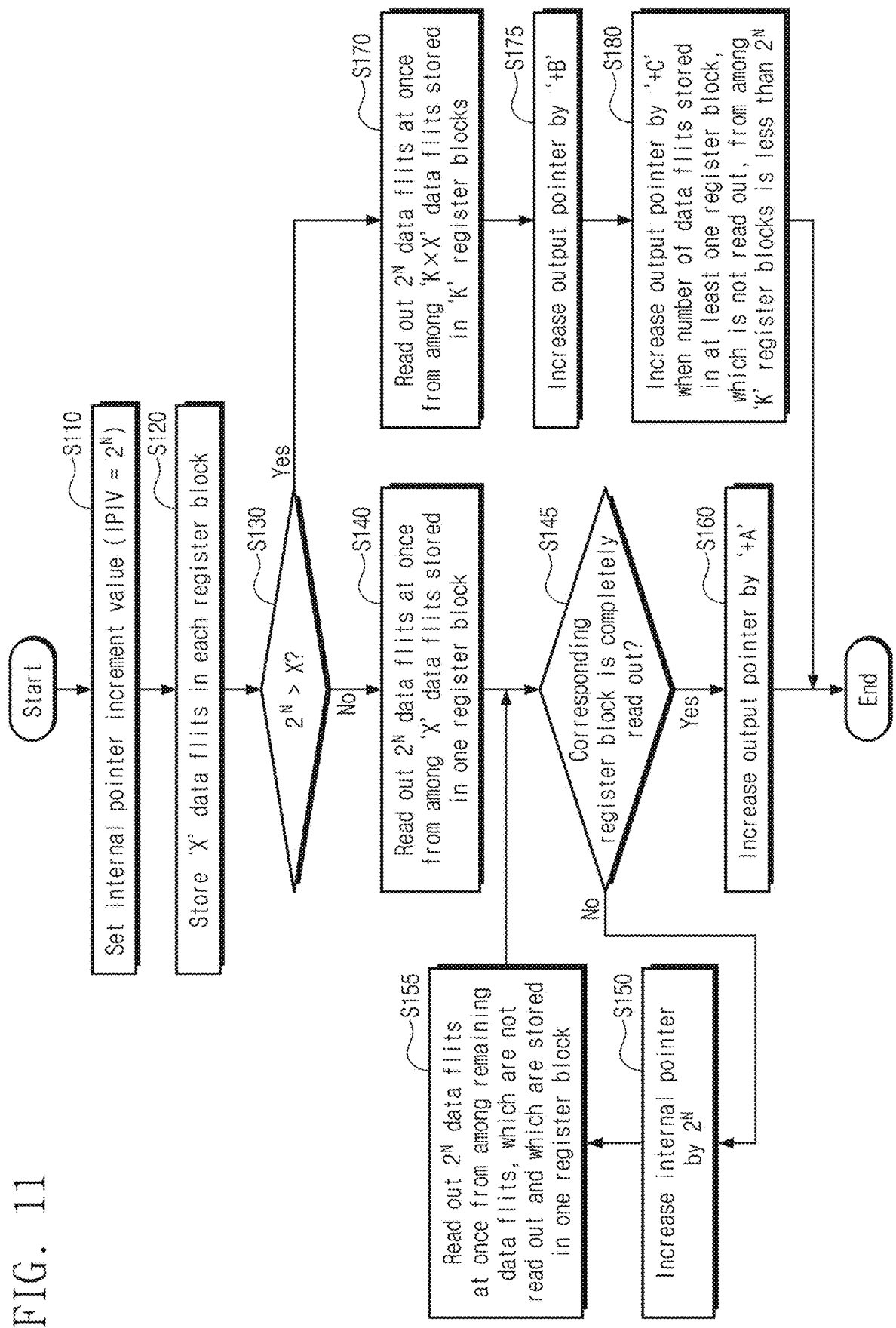
FIG. 11 is a flowchart for describing an operation of the MIMO FIFO buffer circuit shown in FIG. 2.

FIG. 11 is a flowchart for describing an operation of the MIMO FIFO buffer circuit shown in FIG. 2. Referring to FIGS. 1 to 11, an internal pointer increment value (IPIV=$2^N$) is set for the internal pointer generator 250 and the readout control logic circuit 260 (S110).

The write control logic circuit 220 stores '3×4' data flits in units of data flits in the three register blocks RB1 to RB3 among the five register blocks RB1 to RB5 included in the MIMO FIFO register array 230 (S120).

When the internal pointer increment value IPIV is expressed as $2^N$, the readout circuit 240 compares $2^N$ with the number (X) of data flits stored for each register block (S130).

As described with reference to FIGS. 4 to 8, when the internal pointer increment value (IPIV=$2^1$=2) is less than or equal to the number (X=4) of data flits stored for each register block (No in S130), the readout circuit 240 reads out the data flits D1_1 and D1_2, D2_1 and D2_2, or D3_1 and D3_2 at once as many as the number corresponding to the internal pointer increment value (IPIV=$2^1$=2) starting from a data flit, which is indicated by the current internal pointer ITLP(1), from among the four data flits D1_1 to D1_4, D2_1 to D2_4, or D3_1 to D3_4 stored in the corresponding register block RB1, RB2, or RB3 out of the three register blocks RB1, RB2, and RB3 (S140).

The readout circuit 240 determines whether the corresponding register block RB1, RB2, or RB3 is completely read out (S145).

When the corresponding register block RB1, RB2, or RB3 is not completely read out (No in S145), the readout circuit 240 generates the next internal pointer ITLP(2) by adding the internal pointer increment value (IPIV=2) to the current internal pointer ITLP(1) (S150).

The readout circuit 240 reads out the data flits 1_3 and D1_4, D2_3 and D2_4, or D3_3 and D3_4 at once as many as the number corresponding to the internal pointer increment value (IPIV=2) from among the remaining data flits D1_3 and D1_4, D2_3 and D2_4, or D3_3 and D3_4, which are not read out and which are stored in the corresponding register block RB1, RB2, or RB3 (S155).

When the corresponding register block RB1, RB2, or RB3 is completely read out (Yes in S145), the readout circuit 240 generates the next output pointer by adding '+A' (e.g., 'A'=1) to the current output pointer (S160).

However, as described with reference to FIGS. 9 and 10, when the internal pointer increment value (IPIV=$2^3$=8) is greater than the number (X=4) of data flits stored for each register block (Yes in S130), the readout circuit 240 reads out the data flits D1_1 to D1_4, D2_1 to D2_4 at once as many as the number corresponding to the internal pointer increment value (IPIV=$2^3$=8) starting from a data flit, which is indicated by the current internal pointer ITLP(1), from among '3×4' data flits D1_1 to D1_4, D2_1 to D2_4, and D3_1 to D3_4 stored in the three register blocks RB1, RB2, and RB3 (S170).

When the eight data flits D1_1 to D1_4 and D2_1 to D2_4 are completely read out (S170), the readout circuit 240 generates the next output pointer OPT(2) of FIG. 9 by adding '+B' (e.g., 'B'=2) to the current output pointer OPT(1) of FIG. 9 (S175).

When the number of the four data flits D3_1 to D3_4 stored in the third register block RB3, which is not read out, from among the three register blocks RB1, RB2, and RB3 is less than the internal pointer increment value (IPIV=$2^3$=8), the readout circuit 240 reads out the four data flits D3_1 to D3_4 at once and generates the next output pointer OPT(3) in FIG. 10 by adding '+C' (e.g., 'C'=1) to the current output pointer OPT(2) in FIG. 9 (S180).

The present disclosure has been described with reference to one example embodiment shown in the drawings, but this is only exemplary, and it will be understood that various modifications and other equivalent example embodiments are possible from this point by those skilled in the art. The technical protection scope of the present disclosure will be defined by the technical spirit of the appended claims. $2^N$ According to some example embodiments of the present disclosure, a MIMO FIFO buffer circuit, and electronic circuits including the same may configurably set an internal pointer increment value that is capable of reading out the desired number of data flits at once among data flits stored in one or more storage blocks included in a storage array.

Any of the elements and/or functional blocks disclosed above may include or be implemented in processing circuitry such as hardware including logic circuits; a hardware/software combination such as a processor executing software; or a combination thereof. For example, the processing circuitry including the MIMO FIFO buffer circuit 200, post processing logic circuit 300, output pointer determination circuit 273, readout control logic circuit 260, internal pointer generator 250, write control logic circuit 220, and control signal generator 210, more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A multi-input multi-output first-in-first-out (MIMO FIFO) buffer circuit comprising:
   a MIMO FIFO storage array including 'Y' storage blocks; and
   an internal pointer generator configured to generate an internal pointer based on an internal pointer increment value indicating the number of data flits to read out at once from among 'K×X' data flits stored in K storage blocks out of the 'Y' storage blocks,
   wherein each of the 'Y' and the 'K' is a natural number, and the 'K' is equal to or less than the 'Y', and
   wherein each of the 'K' storage blocks is configured to store 'X' data flits.

2. The MIMO FIFO buffer circuit of claim 1, further comprising:
a readout control logic circuit configured to:
compare the internal pointer increment value with the 'X'; and
based on the comparison result, read out the number of data flits at once corresponding to the internal pointer increment value from among the 'X' data flits stored in only one storage block out of the 'K' storage blocks or read out the number of data flits at once corresponding to the internal pointer increment value from among the 'K×X' data flits stored in the 'K' storage blocks.

3. The MIMO FIFO buffer circuit of claim 1, further comprising:
a readout control logic circuit configured to:
in response to the internal pointer increment value being expressed as $2^N$, compare $2^N$ with the 'X';
in response to $2^N$ being equal to or less than the 'X', read out the number of data flits at once corresponding to the internal pointer increment value starting from a data flit indicated by the internal pointer from among the 'X' data flits stored in only the one storage block out of the 'K' storage blocks; and
in response to $2^N$ being greater than the 'X', read out the number of data flits at once corresponding to the internal pointer increment value starting from a data flit indicated by the internal pointer from among the 'K×X' data flits stored in the 'K' storage blocks,
wherein the 'N' is a natural number.

4. The MIMO FIFO buffer circuit of claim 3, wherein the readout control logic circuit is configured to:
in response to $2^N$ being equal to or less than the 'X', increase a next output pointer by "+A" immediately after a readout operation is completely performed on only the one storage block, the next output pointer indicating a location in the storage blocks at which data is to be read; and
in response to $2^N$ being greater than the 'X', increase the next output pointer by "+B" immediately after reading out the number of data flits at once corresponding to the internal pointer increment value starting from the data flit indicated by the internal pointer from among the 'K×X' data flits stored in the 'K' storage blocks, and the 'B' is greater than the 'A'.

5. The MIMO FIFO buffer circuit of claim 4, wherein the readout control logic circuit is configured to:
in response to $2^N$ being greater than the 'X' and a number of unread data flits stored in at least one remaining storage block from among the 'K' storage blocks is less than $2^N$, increase the next output pointer by "+C" immediately after a readout operation is completely performed on the unread data flits, and
the 'C' is equal to or greater than the 'A' and is less than the 'B'.

6. The MIMO FIFO buffer circuit of claim 1, further comprising:
a readout control logic circuit configured to assign a first data flit to be read out from among the 'K×X' data flits based on an output pointer and the internal pointer and to read out a number of first data flits at once corresponding to the internal pointer increment value from among the 'K×X' data flits, the output pointer indicating a location in the storage blocks at which data is to be read and
wherein the first data flits include the first data flit.

7. The MIMO FIFO buffer circuit of claim 6, further comprising:
an output pointer generator configured to determine whether to change the output pointer based on the 'X' and the number of data flits output from the readout control logic circuit.

8. The MIMO FIFO buffer circuit of claim 6, further comprising:
a counter configured to generate a count value by counting the number of data flits output from the readout control logic circuit; and
an output pointer determination circuit configured to determine whether to change the output pointer based on the count value and the 'X'.

9. The MIMO FIFO buffer circuit of claim 8, wherein the output pointer determination circuit is configured to maintain the output pointer as it is when the count value is less than the 'X', and increase the output pointer when the count value is equal to the 'X'.

10. The MIMO FIFO buffer circuit of claim 1, wherein the internal pointer increment value is capable of being programmed by an outside of the MIMO FIFO buffer circuit.

11. A data processing circuit comprising:
a storage array including 'Y' storage blocks;
a write control logic circuit configured to receive 'X' data flits output from each of 'K' data packet generation circuits and to write the 'X' data flits to each of 'K' storage blocks among the 'Y' storage blocks; and
a readout circuit configured to read out a number of data flits at once corresponding to an internal pointer increment value starting from a first data flit specified by an output pointer and an internal pointer from among 'K×X' data flits stored in the 'K' storage blocks,
wherein each of the 'Y' and the 'K' is a natural number, and the 'K' is equal to or less than the 'Y'.

12. The data processing circuit of claim 11, wherein the readout circuit is configured to:
compare the internal pointer increment value with the 'X'; and
based on the comparison result, read out the number of data flits at once corresponding to the internal pointer increment value from among the 'X' data flits stored in only one storage block out of the 'K' storage blocks or read out the number of data flits at once corresponding to the internal pointer increment value from among the 'K×X' data flits stored in the 'K' storage blocks.

13. The data processing circuit of claim 11, wherein the readout circuit is configured to:
in response to the internal pointer increment value being expressed as $2^N$, compare $2^N$ with the 'X';
in response to $2^N$ being equal to or less than the 'X', read out the number of data flits at once corresponding to the internal pointer increment value starting from a data flit indicated by the internal pointer from among the 'X' data flits stored in only the one storage block out of the 'K' storage blocks; and
in response to $2^N$ being greater than the 'X', read out the number of data flits at once corresponding to the internal pointer increment value starting from a data flit indicated by the internal pointer from among the 'K×X' data flits stored in the 'K' storage blocks, and
the "N" is a natural number.

14. The data processing circuit of claim 13, wherein the readout circuit is configured to:
in response to $2^N$ being equal to or less than the 'X', increase a next output pointer by "+A" immediately after a readout operation is completely performed on only the storage block, the next output pointer indicating a location in the storage blocks at which data is to be read; and in response to $2^N$ being greater than the 'X', increase the next output pointer by "+B" immediately after reading out the number of data flits at once corresponding to the internal pointer increment value starting from a data flit, which is indicated by the internal pointer, from among the 'K×X' data flits stored in the 'K' storage blocks; and the 'B' is greater than the 'A'.

15. A data processing system comprising:
'K' data packet generation circuits, each of which is configured to generate a data packet including 'X' data flits; and
a data processing circuit connected to the 'K' data packet generation circuits,
wherein the data processing circuit includes an MIMO FIFO buffer circuit,
wherein the MIMO FIFO buffer circuit includes:
a storage array including 'Y' storage blocks;
a write control logic circuit configured to receive 'X' data flits output from the each of 'K' data packet generation circuits and to write the 'X' data flits to each of 'K' storage blocks among the 'Y' storage blocks; and
a readout circuit configured to read out a number of data flits at once corresponding to an internal pointer increment value starting from a first data flit specified by an output pointer and an internal pointer, from among 'K×X' data flits stored in the 'K' storage blocks, and
wherein each of the 'Y' and the 'K' is a natural number, and the 'K' is equal to or less than the 'Y'.

16. The data processing system of claim 15, wherein the readout circuit is configured to:
compare the internal pointer increment value with the 'X'; and
depending on the comparison result, read out the number of data flits at once corresponding to the internal pointer increment value from among the 'X' data flits stored in only one storage block out of the 'K' storage blocks or read out the number of data flits at once corresponding to the internal pointer increment value from among the 'K×X' data flits stored in the 'K' storage blocks.

17. The data processing system of claim 15, wherein, in response to the internal pointer increment value being expressed as $2^N$, the readout circuit is configured to:
compare $2^N$ with the 'X'; and
in response to $2^N$ being equal to or less than the 'X', read out the number of data flits corresponding to the internal pointer increment value starting from a data flit indicated by the internal pointer from among the 'X' data flits stored in only the one storage block out of the 'K' storage blocks; and
in response to $2^N$ being greater than the 'X', read out the number of data flits at once corresponding to the internal pointer increment value starting from a data flit indicated by the internal pointer from among the 'K×X' data flits stored in the 'K' storage blocks, and
the 'N' is a natural number.

18. The data processing system of claim 17, wherein the readout circuit is configured to:
in response to $2^N$ being equal to or less than the 'X', increase a next output pointer by "+A" immediately after a readout operation is completely performed on only the storage block, the next output pointer indicating a location in the storage blocks at which data is to be read;
in response to $2^N$ being greater than the 'X', increase the next output pointer by "+B" immediately after reading out the number of data flits at once corresponding to the internal pointer increment value starting from a data flit indicated by the internal pointer from among the 'K×X' data flits stored in the 'K' storage blocks; and
the 'B' is greater than the 'A'.

19. The data processing system of claim 15, wherein the readout circuit includes:
an internal pointer generator configured to generate the internal pointer based on the internal pointer increment value;
a readout control logic circuit configured to read out the number of data flits at once corresponding to the internal pointer increment value starting from the first data flit specified by the output pointer and the internal pointer generated by the internal pointer generator from among the 'K×X' data flits stored in the 'K' storage blocks; and
an output pointer generator configured to determine whether to change the output pointer based on the 'X' and the number of data flits output from the readout control logic circuit.

20. The data processing system of claim 15, wherein the data processing system includes an intellectual property (IP), a system on chip (SoC), an integrated circuit (IC), a central processing unit (CPU), a graphics processing unit (GPU), or general-purpose computing on graphics processing units (GPGPU).

* * * * *